United States Patent [19]
Brooks

[11] 3,889,925
[45] June 17, 1975

[54] GATE VALVE AND SEAL

[75] Inventor: Robert C. Brooks, Houston, Tex.

[73] Assignee: Armco Steel Corporation, Middletown, Ohio

[22] Filed: Aug. 31, 1973

[21] Appl. No.: 393,614

[52] U.S. Cl. ............................ 251/327; 251/328
[51] Int. Cl. ............................ F16k 3/316
[58] Field of Search ........... 251/327, 328, 193, 195

[56] References Cited
UNITED STATES PATENTS

| | | | |
|---|---|---|---|
| 1,756,615 | 4/1930 | Wolff | 251/328 |
| 3,036,813 | 5/1962 | Headrick | 251/328 X |
| 3,696,831 | 10/1972 | Fowler | 251/327 X |

FOREIGN PATENTS OR APPLICATIONS

| | | | |
|---|---|---|---|
| 713,699 | 8/1954 | United Kingdom | 251/195 |
| 781,794 | 8/1956 | United Kingdom | 251/328 |
| 1,274,889 | 6/1961 | France | 251/327 |

*Primary Examiner*—Arnold Rosenthal
*Attorney, Agent, or Firm*—Melville, Strasser, Foster & Hoffman

[57] ABSTRACT

A gate valve for both high and low pressure service conditions. A cylindrical, disc-like body sleeve is secured in a circular recess formed in the wall of the valve chamber and encircling both the inlet and outlet openings, the body sleeve having an aperture therethrough in alignment with its respective opening in the valve chamber. Opposed, parallel, spaced apart seat plates are vertically disposed in the valve chamber to define a channel for the gate member. Each seat plate is disposed between the gate member and one of the body sleeves and is provided with an aperture therethrough in alignment with its respective aperture in its respective body sleeve and its respective opening in the valve chamber. Each body sleeve is disposed in its entirety between the wall of the valve chamber and one of the seat plates with the innermost planar end of the body sleeve lying in a plane abutting the outermost surface of the seat plate. The seat plate aperatures are provided there around with seal means to make a tight seal between the seal plate and the body sleeve.

26 Claims, 14 Drawing Figures

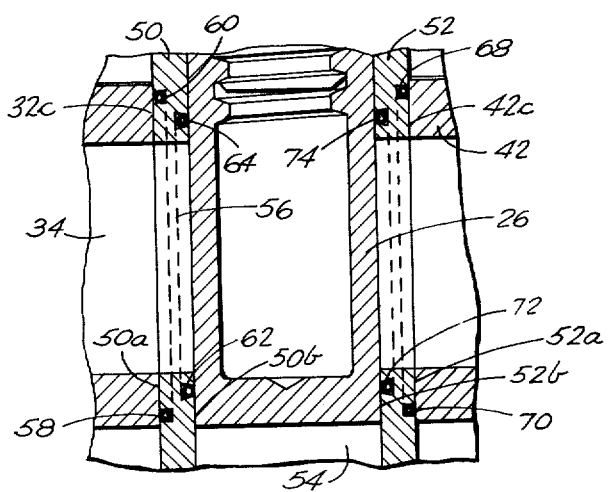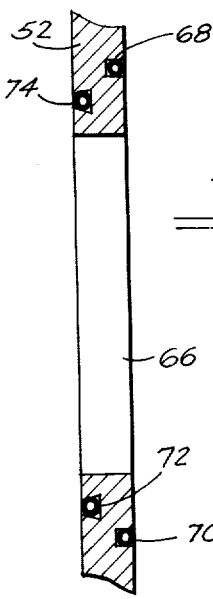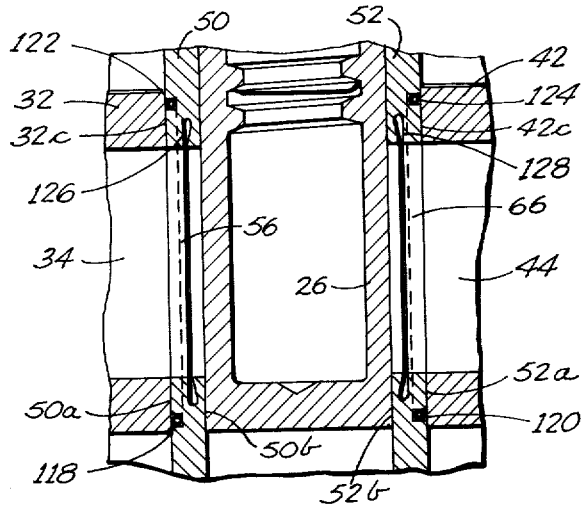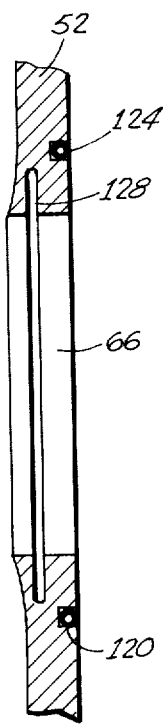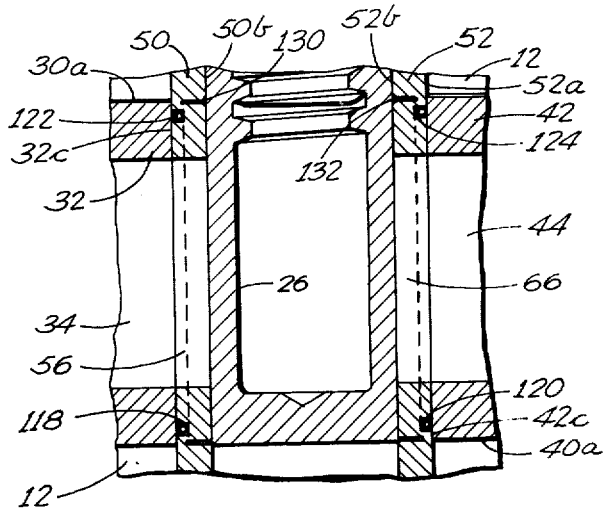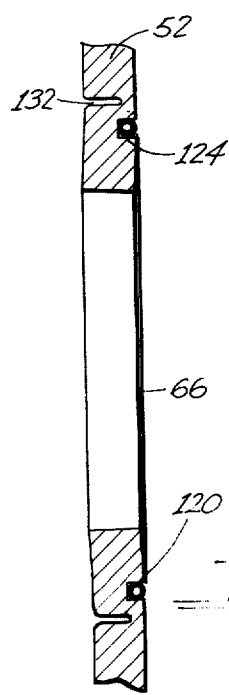

GATE VALVE AND SEAL

BACKGROUND OF THE INVENTION

1. Field of the Invention

This invention relates to gate valves, and more particularly to improved gate valve body configuration and seat plate sealing.

2. Description of the Prior Art

Gate valves, particularly through conduit gate valves, which when opened present an unbroken smooth wall conduit for uninterrupted passage of flow therethrough, are widely used because of their desirable flow characteristics. For example, when such valves are in the open position, the straight through passage, which is provided, offers no more appreciable resistance to fluid flow than an equal length of pipe. Although good flow characteristics are important, an even more important aspect of any valve is its ability to seal.

A major problem attributable to gate valve bodies is the distortion thereof under pressure, due to line strains or due to temperature changes. Such distortions inevitably cause valve seats to leak because of uneven support against thrust loads and because of loss of circularity and thus flatness. Furthermore, such distortions cause excessive localized bearing pressures, resulting in galling or local wear on the grooving of seal faces.

The prior art has endeavoured to deal with the problem of gate valve body distortions by providing unduly heavy valve bodies, by using flexible light weight seat plates and gate members, for low pressure surface conditions, and by using long tubular valve seats in body pockets. However, such typical solutions have not proven to be successful. For example, with respect to the use of long tubular valve seats in body pockets, side thrusts due to gate member friction cock the valve seats and distort them out-of-round.

Prior art seat plate sealing has also been unsuccessful in developing a long wearing, erosion resistant, blowout proof, seat-to-gate member seal which assures gate member contact on minimum diameter for upstream sealing, or which flattens under extreme loads to distribute bearing pressure and minimize galling potential. For example, the metal lip on conventional prior art seat plates is fragile and expensive to manufacture and does not provide full bearing support. Prior art "O" ring seals blow out, cut and erode. Additionally, prior art pressed insert seals compress, blow out and erode.

Finally, it should be noted that prior art gate valves have been very costly to manufacture because of the many necessary machining operations on the valve bodies.

SUMMARY OF THE INVENTION

The present invention provides a gate valve wherein the valve body is cast or forged. A cylindrical disc-like body sleeve is secured in a circular recess formed in the wall of the valve chamber encircling both the inlet and the outlet openings in the chamber, with each body sleeve having an aperture therethrough in alignment with its respective opening in the chamber.

Opposed, parallel, spaced apart seat plates are vertically disposed in the valve chamber to define a channel for the movement of the gate member. Each seat plate is disposed between the gate member and one of the body sleeves and is provided with an aperture therethrough in alignment with its respective aperture in its respective body sleeve and its respective opening in the valve chamber. The aperture in each seat plate is provided therearound with seal means to make a tight seal between the seat plate and its respective body sleeve and between the gate member and the seat plates.

In preferred embodiments annular grooves may be provided around the aperture in each seat plate to allow for the pre-dishing of the seat plates against the gate member.

The present invention eliminates many of the costly prior art machining operations on valve bodies, since the body itself is cast or forged and all special machining operations are performed on inserted parts. Furthermore, the valve body of the present invention, through the body sleeve, fully supports the seat plates under thrust load of pressure. The valve body of the present invention maintains flatness in spite of body distortion due to pressure, line strains and temperature. Furthermore, the valve body of the present invention maintains circularity in spite of body distortion and side thrust due to gate member friction drag.

The seat plate sealing provided around the aperture thereof, to make a tight seal between the seat plate and its respective body sleeve and between the gate member and the seat plates assures gate member contact on minimum diameter for upstream sealing. Furthermore, the seat plate flattens under extreme loads to distribute bearing pressure and minimize galling potential. Finally, the seat plate sealing means of the present invention is long wearing, erosion resistant, and provides a blow-out proof seat-to-gate member seal.

BRIEF DESCRIPTION OF THE DRAWING

FIGS. 5 through 9 are large, fragmentary sectional views of the body sleeves, seating plates and gate member of the gate valve of the present invention showing various sealing means provided around the aperture in each seat plate to make a tight seal between the seat plate and its respective body sleeve and between the gate member and the seat plates.

FIGS. 5A through 9A are large, fragmentary sectional views of the seat plates of FIGS. 5, 6, 7, 8 and 9, respectively.

DESCRIPTION OF THE PREFERRED EMBODIMENT

Figure 1:
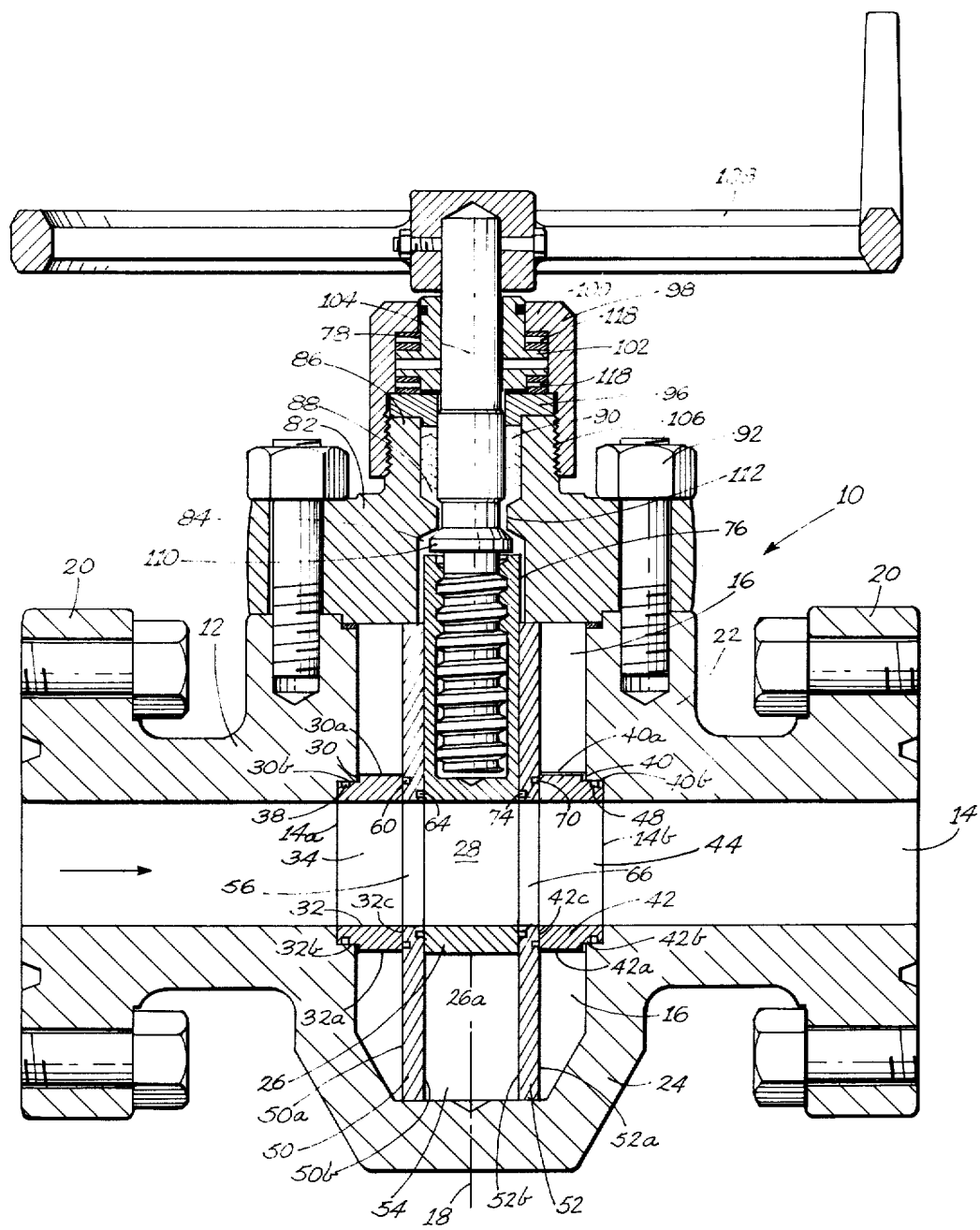
FIG. 1 is a fragmentary, axial section through the gate valve of the present invention, with the plane of the section coincident with the axis of the flow passageway therethrough, and when the gate member is in the opened position.

Referring to the drawings and to FIGS. 1 through 4 and 7, in particular, shown therein and generally designated by the reference character 10 is a gate valve, constructed in accordance with the present invention. The gate valve 10 includes a valve body 12 formed with a flow passage 14. A cylindrical valve chamber 16 having a vertical axis 18 is formed in the valve body 12 and intersects the flow passage 14 to define diametrically opposed inlet and outlet openings 14a and 14b in the valve chamber 16. However, it will be understood that either of the openings 14a and 14b can serve as either the inlet or the outlet so that the valve 10 may be used to control flow in either direction. The valve body 12 is provided with flanges adjacent the outer ends of the flow passage 14 to facilitate connection of the flow passage 14 with suitable conduits (not shown).

The valve body 12, which is preferably cast or forged, includes upper and lower extensions 22 and 24, respectively, and the cylindrical valve chamber 16 extends through the body 12 transversely with respect to the axis of the flow passage 14 and through both extensions 22 and 24. A rectangularly shaped gate member 26 is mounted for movement by way of pin guides 27 within the valve chamber 16. The gate member 26 is provided with a circular part 28 which is adapted to be aligned with, or moved out of alignment with, the flow passage 14 by movement of the gate member 26 within the chamber 16.

A circular recess 30 is formed in the wall of the valve chamber 16 encircling the inlet opening 14a. The circular recess is provided with a large diameter portion 30a and a small diameter portion 30b. A cylindrical, disc-like body sleeve 32 is secured, as by welding or the like, in the circular recess 30. The body sleeve 32 is provided with an innermost planar end 32c and with a large diameter portion 32a and a small diameter portion 32b which mate with the large and small diameter portions 30a and 30b, respectively, of the circular recess 30. An aperture 34 is provided through the body sleeve 32 in alignment with the inlet opening 14a. The outer surface of the small diameter portion 32b of the body sleeve 32 is provided with an annular groove 36 within which an O ring 38 is mounted for sealing against the circumferential wall of the small diameter portion 30b of the circular recess 30.

Figure 2:
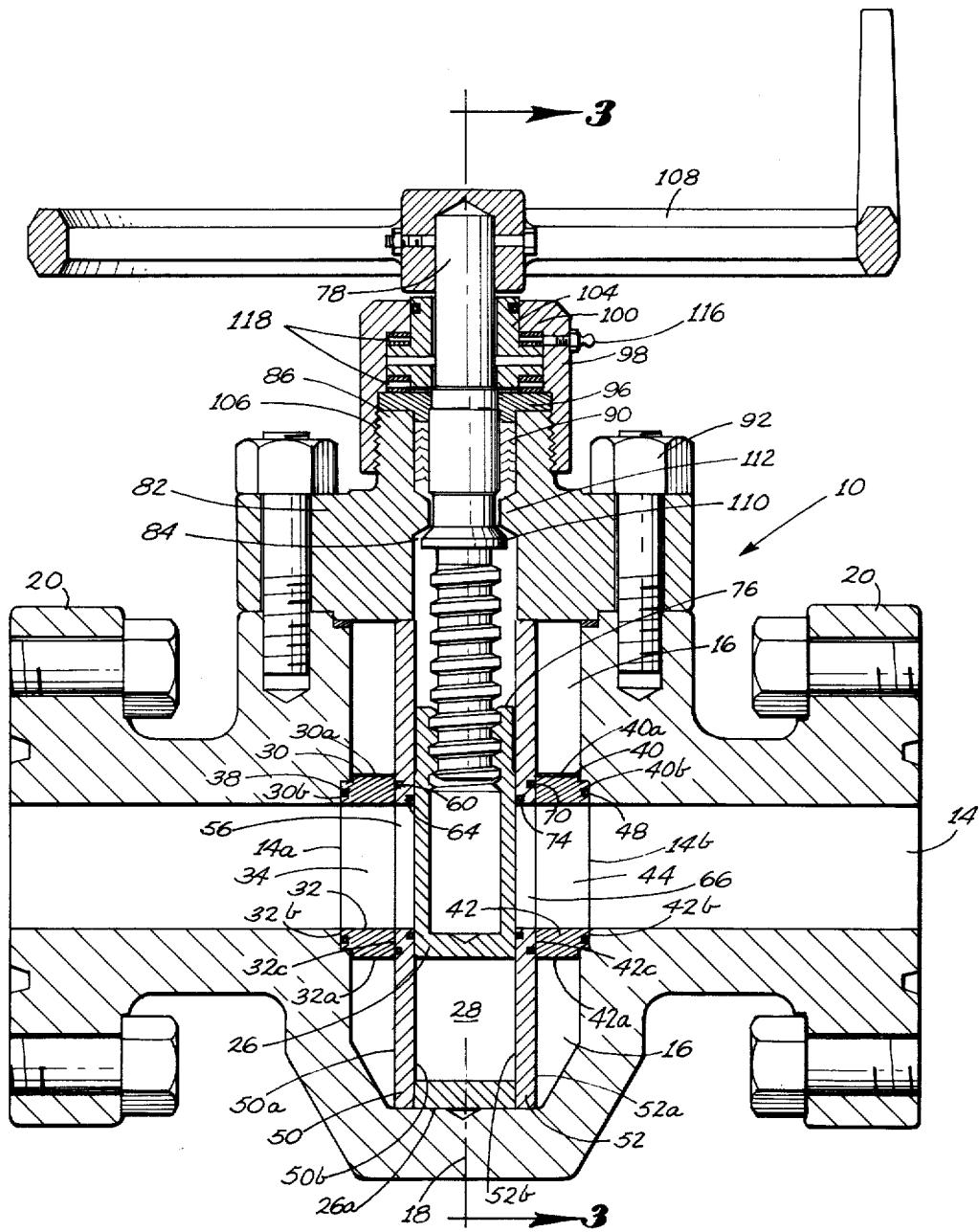
FIG. 2 is a fragmentary, axial section similar to FIG. 1 when the gate member is in the closed position.

As best seen in FIGS. 1, 2 and 7, a circular recess 40 is similarly formed in the wall of the valve chamber 16 encircling the outlet opening 14b. The circular recess 40 is provided with a large diameter portion 40a and a small diameter portion 40b. A cylindrical, disc-like body sleeve 42 is secured, as by welding or the like, in the circular recess 40. The body sleeve 42 is provided with an innermost planar end 42c and with a large diameter portion 42a and with a small diameter portion 42b both of which mate with the large and small diameter portions 40a and 40b, respectively, of the circular recess 40. An aperture 44 is provided through the body sleeve 42 in alignment with the outlet opening 14b. The outer surface of the small diameter portion 42b of the body sleeve 42 is provided with an annular groove 46 within which an O ring 48 is mounted for sealing against the circumferential wall of the small diameter portion 40b of the circular recess 40.

It will be apparent that the body sleeves 32 and 42 must be inserted through the valve chamber 16. For this reason the chamber is made having a diameter D (FIG. 4) which is greater than the outside diameter of the body sleeves 32 and 42.

Opposed, parallel, spaced apart, seat plates 50 and 52 are vertically disposed in the cylindrical valve chamber 16 to define a channel 54 for movement of the gate member 26. The seat plate 50, which is disposed between the gate member 26 and the body sleeve 30, is provided with an aperture 56 therethrough in alignment with the aperture 34 in the body sleeve 32 and the inlet opening 14a in the chamber 16. As can best be seen in FIGS. 1, 2 and 7, the outer surface 50a of the seat plate 50 is contiguous with the innermost planar end wall 32c of the body sleeve 32, and is provided with an annular groove 58 within which an O ring 60 is mounted for sealing against the end wall 32c of the body sleeve 32. In like manner, the inner surface 50b of the seat plate 50 is provided with an annular groove 62 around the aperture 56, configured as shown, within which an O ring 64 is mounted for sealing against the gate member 26.

It will be seen that the body sleeve 32 is disposed in its entirety between the wall of the valve chamber 16 and the seat plate 50 with the innermost planar end wall 32c of the body sleeve 32 lying in a plane abutting the outermost surface 50a of the seat plate 50.

The seat plate 52, which is disposed between the gate member 26 and the body sleeve 42, is provided with an aperture 66 therethrough in alignment with the aperture 44 in the body sleeve 42 and the outlet opening 14b in the chamber 16. As can be seen, the outer surface 52a of the seat plate 52 is contiguous with the end wall 42c of the body sleeve 42, and is provided with an annular groove 68 within which an O ring 70 is mounted for sealing against the innermost planar end wall 42c of the body sleeve 42. In like manner, the inner surface 52b of the seat plate 52 is provided with an annular groove 72 around the aperture 66, configured as shown, within which an O ring 74 is mounted for sealing against the gate member 26.

It will be seen that the body sleeve 42 is disposed in its entirety between the wall of the valve chamber 16 and the seat plate 52 with the innermost planar end wall 42c of the body sleeve 42 lying in a plane abutting the outermost surface 52a of the seat plate 50.

An upstream seal is accomplished by providing the seal ring 64 in the seat plate 50 with a diameter smaller than that of the seal ring 60. Accordingly, flow passage pressure acting on the differential area always urges the seat plate 50 against the gate 26. This in effect provides two seals in tandem when the gate 26 is closed to double the effectiveness of the valve 10 as well as to aid in the retension of the valve grease.

It will again be apparent that the seat plates 50 and 52 must be inserted through the chamber 16. For this reason the chamber 16 is made having a diameter D (FIG. 4) which is greater than the width of the seat plates 50 and 52.

As can be seen, the gate member 26 is disposed for movement within the channel 54 from a first position closing the flow passage 14, in which case the circular port 28 is out of alignment with the flow passage 14, to a second psoition wherein the flow passage is open, in which case the circular port 28 is adapted to be aligned with the flow passage 14. Operating means are provided extending through the valve body 12 into the valve chamber 16 and operatively connected with the gate member 26 to move the gate member 26 between the aforementioned first and second positions and arranged to permit movement of the gate member 26 transversely to the flow passage 14 within the channel 54.

The upper end of the plate 26 is provided with a cylindrical extension 76 which is threaded internally. The stem of the cylindrical operating rod 78 for the valve 10 is provided at its lower end with external threads to engage the internal threads of the extension 76.

A bonnet member 82, having a central aperture 84 for receipt of the stem 78 and a neck portion 86 which forms a packing cavity 88 containing a suitable packing 90, is secured by cap screws 92 to the valve body 12. The packing 90 is retained within the packing cavity 88 by the packing gland 96. A retaining nut 98, provided at its upper end with an inwardly directed flange 100, engages the thrust bearing 118 which in turn engages the flange 102 of the operating nut 104, and is screwed onto the threads 106 formed on the end of the neck portion 86 of the cap member 82. A hand wheel 108 is operatively secured to the end of the stem 78.

When the hand wheel 108 is turned, the valve stem 78 is rotated to move the gate member 26 to its open or closed position, respectively. The axial up and down movement of the valve stem 78 and the operating nut 104, which are threaded and pinned together, is limited by the thrust bearing 118 between the flange 102 and the inwardly directed flange 100 and the thrust bearing 118 between the flange 102 and the gland 96.

Figure 3:
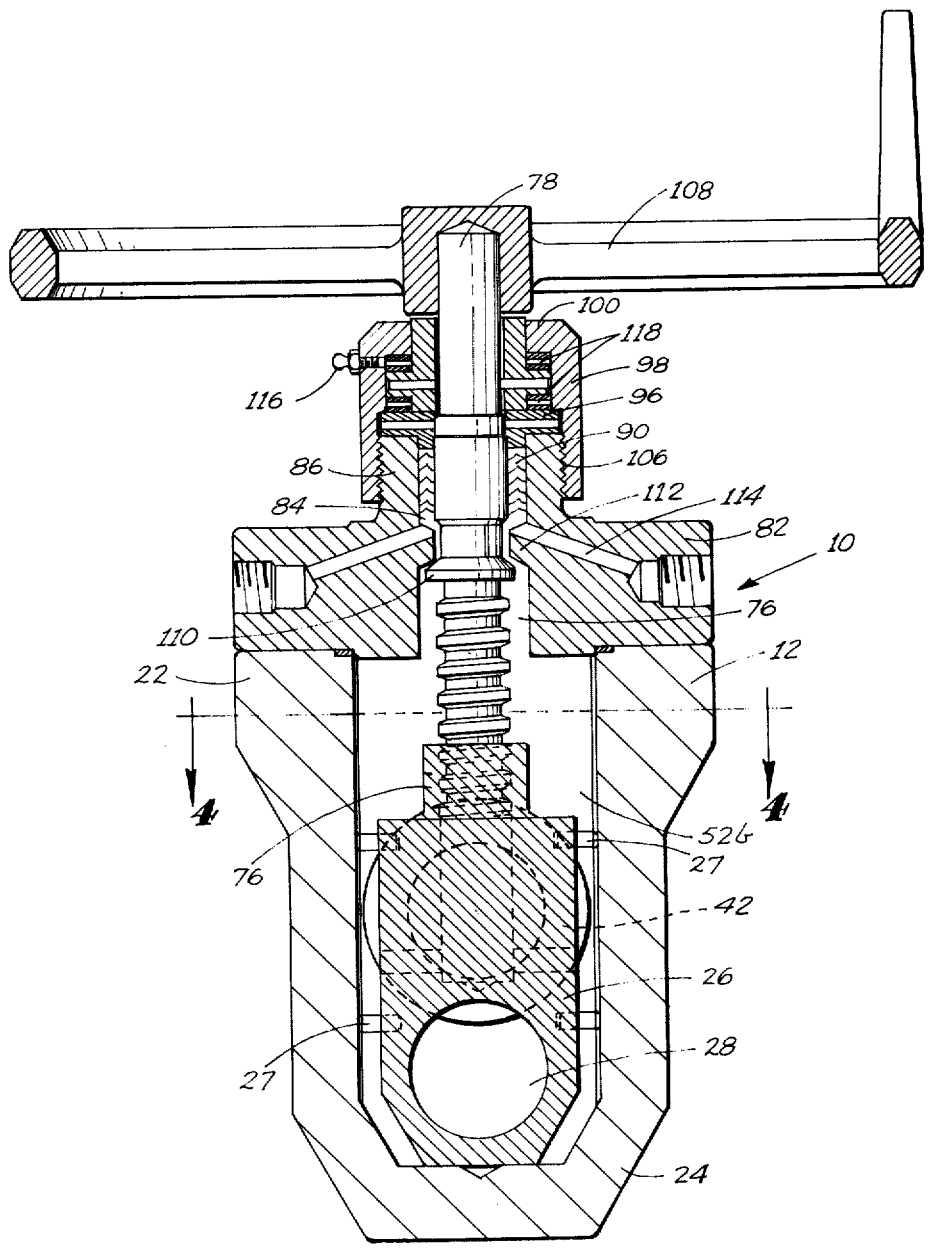
FIG. 3 is a fragmentary cross-sectional view taken along the line 3—3 of FIG. 2.
Figure 4:
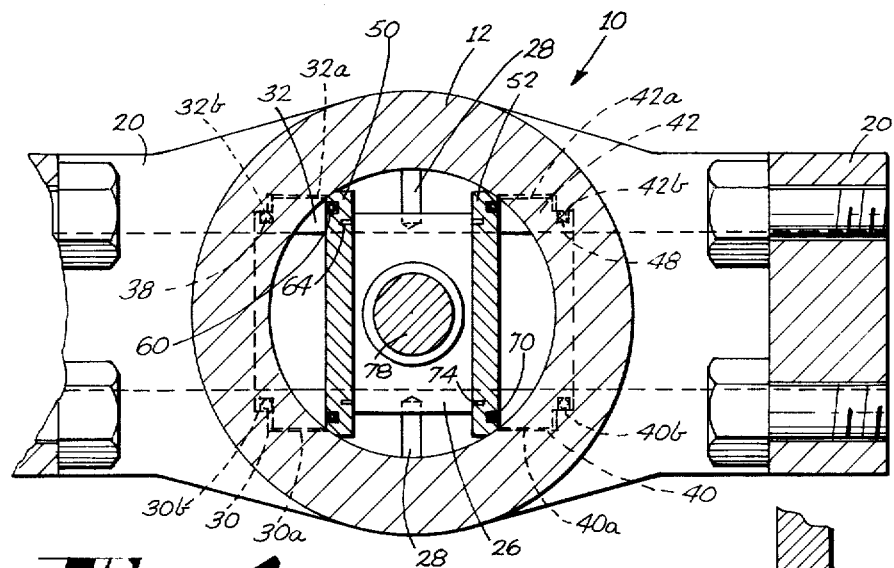
FIG. 4 is a fragmentary cross-sectional view taken along the line 4—4 of FIG. 3.

As best seen in FIG. 3, ports 114 are provided in the bonnet member 82 to permit injection of valve grease for lubricating the movable parts of the valve. Similarly, a grease fitting 116 is provided on the retaining nut 98 to permit lubrication of the thrust bearings 118.

Turning now to FIGS. 5, 6, 8 and 9, additional sealing means between the body sleeves 32, 42, the seat plates 50, 52 and the gate member 26 of the valve 10 of the present invention will be explained. To avoid unnecessary duplication of the description previously recited, like parts will be shown in FIGS. 5, 6, 8 and 9 with reference numerals previously utilized in connection with the description of FIGS. 1 through 4 and 7. However, new sealing elements and the like will be described with new reference numerals.

Figure 5:
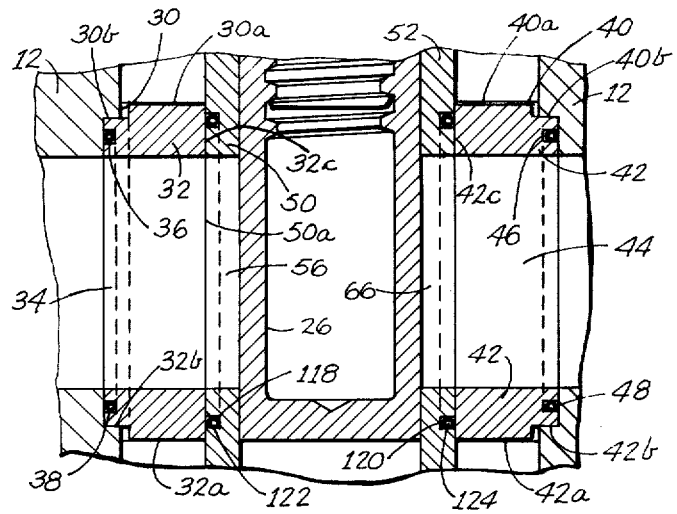

Turning first to FIG. 5, it has been found that circumstances may be such that it will only be necessary to provide sealing means between the outer surfaces 50a and 52a of the seat plates 50 and 52 and with the end walls 32c and 42c of the body sleeves 32 and 42, respectively. To this end, the apertures 118 and 120 are provided in the outer surfaces 50a and 52a of the seat plates 50 and 52 within which O rings 122 and 124 are mounted for sealing against the end walls 32c and 42c of the body sleeves 32 and 42, respectively.

Figure 6:
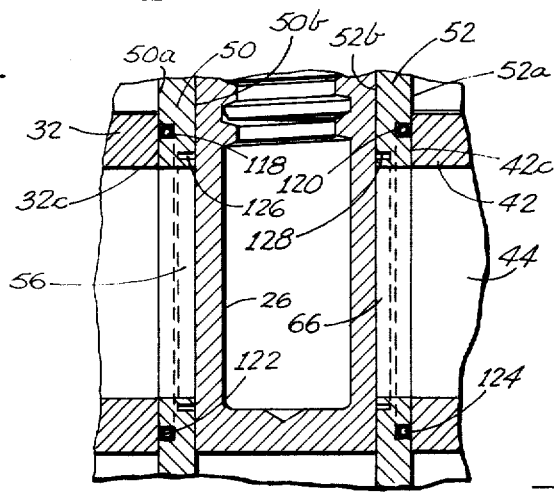

In FIG. 6 the sealing means between the outer surfaces 50a and 52a of the seat plates 50 and 52 and the end walls 32c and 42c of the body sleeves 32 and 42, respectively, are similar to that shown in FIGS. 1 and 7. As can be seen, the O ring seals 122 and 124 are provided between the outer surfaces 50a and 52a of the seat plates 50 and 52 for sealing against the end walls 32c and 42c of the body sleeves 32 and 42, respectively. In similar manner, the inner surfaces 50b and 52b contiguous with the surface of the gate member 26 are provided with annular grooves 119 and 121 of elongated cross section around the aperture 66 within which the elongated seals 126 and 128 are mounted for sealing against the gate member 26.

FIGS. 8 and 9 are identical to FIG. 5, in that only one O ring seal 122 and 124 is provided between the outer surfaces 50a and 52a of the seat plates 50 and 52 for sealing against the end walls 32c and 42c of the body sleeves 32 and 42, respectively. In the embodiment of FIG. 8, the circumferential edge surface of the aperture 56, 66 in each of the seat plates 50, 52 is provided with an elongated annular groove 126, 128 to aid in the predisking of the seat plates 50, 52 around the respective apertures 56, 66 thereof under extreme loads, so as to distribute bearing pressure and minimize galling potential.

In the embodiment of FIG. 9, the surface 50b, 52b of each seat plate 50, 52 contigous with the surface of the gate member 26 is provided with an elongated annular groove 130, 132 around the respective apertures 56, 66, in the seat plates 50, 52, respectively, with the elongated annular grooves 130, 132 being concentric with the outer circumferential surface of the large diameter portion 30a, 40a of the body sleeve 32, 42, respectively. The elongated annular grooves 130, 132 aid in the flattening of the seat plates 50, 52 around the respective apertures 56, 66 thereof under extreme loads so as to distribute bearing pressure and minimize galling potential.

It should, of course, be noted with reference to the sealing rings on one or both sides of the seat plates 50 and 52, that the valve 10 of the present invention will function by sealing between the seat plate on the down stream side, as disclosed, for example, in FIG. 5. However, the loss of valve lubricant from the body cavity is excessive due to fluctuating pressure from the flow passage 14 into the valve chamber 16 and out again. Accordingly, the purpose of the seat plates 50 and 52 of the valve 10 of the present invention is to provide sealing elements that will accomplish both an upstream seal and a downstream seal when the gate 26 is closed; or when the gate 26 is opened, which will accomplish an effective seal between the seat plates 50 and 52 and the port 66 in the gate 26, in order to effectively isolate the grease filled body cavity form the flow passage 14.

Figure 6A:

In FIGS. 1, 2, 6 and 7, and as best seen in FIGS. 6A and 7A, the seat plates 50 and 52 are made flat because the resilent sealing rings 64, 74 and 126, 128 bridge the clearance gap between seat plates 50 and 52 and the gate member 26.

Figure 5A:
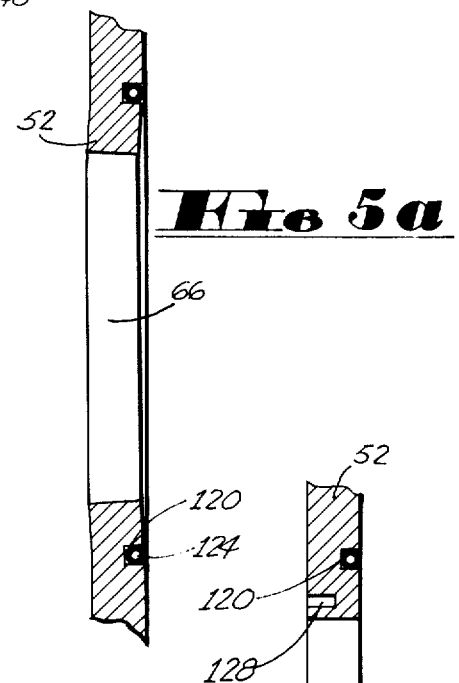

In FIGS. 5, 8 and 9, and as best seen in FIGS. 5A, 8A and 9A, the sealing rings are eliminated between the seat plates 50 and 52 and the gate 26. In order to bridge the clearance gap between the seat plates 50 and 52 and the gate 26 and to also provide a contacting seal diameter smaller than the seal rings 122 and 124, for effective upstream sealings, the seat plates 50 and 52 are dished in a cone shape around the flow passage axes through the apertures 56 and 66 in a manner to contact the gate 26 by the inner circumference of the apertures 56 and 66 of the seat plates 50 and 52 respectively. Each of the seat plates 50 and 52 of FIGS. 5, 8 and 9, as best seen in FIGS. 5A, 8A and 9A, is provided with circumferential web or flexing areas so that under extreme pressure loads the seat plates cone or dished configuration may be pressed flat between the gate 26 and the disc-line body sleeves 32 and 42, so as to distribute bearing pressure and minimize galling potential.

Various resilient materials may be used for the O rings, the selection depending somewhat on operating conditions. For example, such materials may include synthetic rubbers, such as Hycar or Neoprene. Also other elastomers can be used, such as nylor or Teflon, which are more resistant to certain chemicals, and somewhat harder than synthetic rubbers.

In view of the foregoing, it is evident that the present invention eliminates many of the costly prior art machining operations on valve bodies, since, the body 12 itself is cast or forged and all special machining operations are performed on inserted parts, such as the body sleeves 32 and 42. Furthermore, the valve body 12 of the gate valve 10 of the present invention, through the body sleeves 32 and 42 fully supports the seat plates 50 and 52 under thrust load pressure. The valve body 12 of the gate valve 10 of the present invention maintains flatness in spite of body distortion due to pressure, line strains and temperature. Furthermore, the valve body 12 maintains circularity in spite of body distortion and side thrust due to friction drag of the gate member 26. The seat plate sealing provided around the aperture thereof, to make a tight seal between each seat plate 50, 52 and its respective body sleeve 32, 42, and, if necessary, between the gate member 26 and the seat plates 50, 52, assures gate member contact on minimum diameter for upstream sealing. Furthermore, the seat plates 50, 52 flatten under extreme loads to distribute bearing pressure and minimize galling potential. Finally, the seat plate sealing means of the present invention is long wearing, erosion resistant, and provides a blow-out proof seat-to-gate member seal.

It will be understood that certain features and sub-combinations are of utility and may be employed without reference to other features and sub-combinations. For example, the seat plates 50 and 52 of the present invention, which provide upstream and downstream sealing, may work equally well in a heavy-bodied valve with broached cavity. This is contemplated by and is within the scope of the appended claims.

As many possible embodiments may be made of the invention without departing from the scope thereof, it is to be understood that all matter herein set forth or shown in the accompanying drawings is to be interpreted as illustrative and not in a limiting sense.

The embodiments of the invention in which an exclusive property or privilege is claimed are defined as follows:

1. In a gate valve of the type having a valve body formed with a flow passage, a cylindrical valve chamber having a vertical axis formed in said valve body and intersecting said flow passage to define diametrically opposed inlet and outlet openings in said chamber, a gate member having parallel planar sealing surfaces and being disposed for movement within said valve chamber from a first position closing said flow passage to a second position wherein said flow passage is open, and operating means extending through said valve body into said valve chamber and operatively connected with said gate member to move said gate member between said first and second positions and arranged to permit movement of said gate member transversely to said flow passage, the improvement, in combination therewith, comprising:
   a. a circular recess formed in the wall of said valve chamber and encircling each said inlet and outlet opening, said circular recesses being concentric and comprising a large diameter portion and a small diameter portion;
   b. a cylindrical, disc-like body sleeve secured in each said circular recess, each said body sleeve having an innermost planar end and comprising a large diameter portion and a small diameter portion mating with said large and small diameter portions of its respective circular recess and having an aperture therethrough in alignment with its respective opening in said chamber; and
   c. opposed, parallel, spaced apart seat plates vertically disposed in said chamber to define a channel for movement of said gate member, each said seat plate having an outermost surface and being disposed between said gate member and one of said body sleeves and having an aperture therethrough in alignment with its respective aperture in its respective body sleeve and its opening in said chamber, each said body sleeve being disposed in its entirety between the wall of said valve chamber and one of said seat plates with the innermost planar end of said body sleeve lying in a plane abutting the outermost surface of said seat plate, said aperture of each said seat plate being provided therearound with seal means to make a tight seal between the outermost surface of said seat plate and the innermost planar end of said body sleeve;

whereby said valve body, through said body sleeves, fully supports said seat plates under thrust load of pressure, maintains flatness in spite of body distortion due to pressure, line strains and temperature, and maintains circularity in spite of valve body distortion and side thrust due to gate member friction drag.

2. The gate valve according to claim 1, wherein at least one O ring makes the tight seal between each said seat plate and the end wall of its respective body sleeve.

3. The gate valve according to claim 1, wherein each said seat plate is dished at the edges of said aperture therethrough, to help with the sealing at the edge of said aperture, when excessive pressure is applied.

4. The gate valve according to claim 1, wherein the large diameter portion of each said circular recess is adjacent its respective seat plate.

5. The gate valve according to claim 4, wherein the outer surface of said small diameter portion of each said body sleeve is provided with an annular groove within which an O ring is mounted for sealing against the wall of said small diameter portion of each said circular recess.

6. The gate valve according to claim 5, wherein the outermost surface of each said seat plate abutting the innermost planar end of its respective body sleeve is provided with an annular groove within which an O ring is mounted for sealing against the innermost planar end of said body sleeve.

7. The gate valve according to claim 6, wherein the surface of each said seat plate contiguous with the surface of said gate member is provided with an annular groove around said aperture in said seat plate within which an O ring is mounted for sealing against said gate member to make a tight seal between said gate member and said seat plate.

8. The gate valve according to claim 6, wherein the surface of each said seat plate contiguous with the surface of said gate member is provided with an annular groove around said aperture in said seat plate to aid in the pre-dishing of said seat plate around said aperture thereof under extreme loads, so as to distribute bearing pressure and to minimize galling potential.

9. The gate valve according to claim 8, wherein said seat plate is provided with a circumferential web flexing area so that under extreme pressure loads said pre-dishing portion thereof is pressed flat between said body sleeve and said gate member.

10. The gate valve according to claim 6, wherein the circumferential edge surface of said aperture in each said seat plate is provided with an elongated annular groove to aid in the pre-dishing of said seat plate around said aperture thereof under extreme loads, so as to distribute bearing pressure and to minimize galling potential.

11. The gate valve according to claim 10, wherein each said seat plate is provided with a circumferential web flexing area so that under extreme pressure loads said pre-dishing portion thereof is pressed flat between said body sleeve and said gate member.

12. The gate valve according to claim 8, wherein said groove is adjacent said aperture in said seat.

13. The gate valve according to claim 8, wherein said groove is elongated and is concentric with the outer circumferential surface of said large diameter portion of said body sleeve.

14. In a gate valve of the type having a valve body formed with a flow passage, a cylindrical valve chamber having a vertical axis formed in said valve body and intersecting said flow passage to define opposed inlet and outlet openings in said chamber, and a gate member movable across said valve chamber for opening and closing said flow passage, the improvement, in combination therewith, comprising:
   a. a circular recess formed in the wall of said valve chamber and encircling each said inlet and outlet opening, said circular recesses being concentric;
   b. a cylindrical, disc-like body sleeve secured in each said circular recess, each said body sleeve having an innermost planar end and an aperture therethrough in alignment with its perspective opening in said chamber; and
   c. opposed, parallel, spaced apart seat plates vertically disposed in said valve chamber to define a channel for movement of said gate member, each said seat plate having an outermost surface and being disposed between said gate member and one of said body sleeves and having an aperture therethrough in alignment with its respective aperture in its respective body sleeve and its respective opening in said chamber, each said body sleeve being disposed in its entirety between the wall of said valve chamber and one of said seat plates with the innermost planar end of said body sleeve lying in a plane abutting the outermost surface of said seat plate;
   whereby said valve body, through said body sleeves, fully supports said seat plates under thrust load of pressure, maintains flatness inspite of body distortion due to pressure, line strains and temperature, and maintains circularity inspite of valve body distortion and side thrust due to gate member friction drag.

15. The gate valve according to claim 14, wherein each said circular recess comprises a large diameter portion and a small diameter portion, and each said body sleeve comprises a large diameter portion and a small diameter portion mating with said large and small diameter portions of its respective circular recess.

16. The gate valve according to claim 15, wherein each said large diameter portion of each said circular recess is adjacent its respective seat plate.

17. The gate valve according to claim 15, wherein said aperture of each said body sleeve is provided therearound with seal means to make a tight seal between the outermost surface of its respective seat plate and the innermost planar end of said body sleeve.

18. The gate valve according to claim 17, wherein the outer surface of said small diameter portion of each said body sleeve is provided with an annular groove within which an O ring is mounted for sealing against the wall of said small diameter portion of each said circular recess.

19. The gate valve according to claim 18, wherein the outermost surface of each said seat plate abutting the innermost planar end of its respective body sleeve is provided with an annular groove in which an O ring is mounted for sealing against the innermost planar end of said body sleeve.

20. The gate valve according to claim 18, wherein the surface of each said seat plate contiguous with the surface of said gate member is provided with an annular groove around said aperture in said seat plate within which an O ring is mounted for sealing against said gate member to make a tight seal between said gate member and said seat plate.

21. The gate valve according to claim 18, wherein the surface of each said seat plate contiguous with the surface of said gate member is provided with an annular groove around said aperture in said seat plate to aid in the pre-dishing of said seat plate around said aperture thereof under extreme loads, so as to distribute bearing pressure and to minimize galling potential.

22. The gate valve according to claim 21, wherein each said seat plate is provided with a circumferential web flexing area so that under extreme pressure loads said pre-dishing portion thereof is pressed flat between said body sleeve and said gate member.

23. The gate valve according to claim 18, wherein the circumferential end surface of said aperture in each said seat plate is provided with an elongated annular groove to aid in the pre-dishing of said seat plate around said aperture thereof under extreme loads, so as to distribute bearing pressure and to minimize galling potential.

24. The gate valve according to claim 23, wherein each said seat plate is provided with a circumferential web flexing area so that under extreme pressure loads said pre-dishing portion thereof is pressed flat between said body sleeve and said gate member.

25. The gate valve according to claim 21, wherein said groove is adjacent said aperture in said seat.

26. The gate valve according to claim 21, wherein said groove is elongated and is concentric with the outer circumferential surface of said large diameter portion of said body sleeve.

* * * * *